(12) United States Patent
Lemoult et al.

(10) Patent No.: US 7,885,734 B2
(45) Date of Patent: Feb. 8, 2011

(54) METHOD FOR DETECTING AN ERROR IN INPUT OF ONE OF THE TAKEOFF PARAMETERS INTO A FLIGHT MANAGEMENT SYSTEM

(75) Inventors: Frederic Lemoult, Toulouse (FR); Jean-Pierre Demortier, Maurens (FR); Fabien Pitard, Toulouse (FR); Damien Betouret, Toulouse (FR); Frederic Marani, Pechbonnieu (FR); Isabelle Lacaze, Colomiers (FR); Jean-Louis De Menorval, Ausonne (FR); Gael Marchand, Toulouse (FR); Adrien Ott, Toulouse (FR); Maxime Wachenheim, Toulouse (FR)

(73) Assignee: Airbus France, Toulouse (FR)

( * ) Notice: Subject to any disclaimer, the term of this patent is extended or adjusted under 35 U.S.C. 154(b) by 737 days.

(21) Appl. No.: 11/559,917

(22) Filed: Nov. 15, 2006

(65) Prior Publication Data

US 2007/0288130 A1 Dec. 13, 2007

(30) Foreign Application Priority Data

Nov. 28, 2005 (FR) ................................. 05 12019

(51) Int. Cl.
*G06F 7/00* (2006.01)
*B64C 17/00* (2006.01)
(52) U.S. Cl. ..................................................... 701/15
(58) Field of Classification Search .............. 701/14–15
See application file for complete search history.

(56) References Cited

U.S. PATENT DOCUMENTS

| 3,120,658 | A | * | 2/1964 | Lukesh et al. | 342/106 |
|---|---|---|---|---|---|
| 3,504,335 | A | * | 3/1970 | Hall et al. | 340/959 |
| 3,691,356 | A | * | 9/1972 | Miller | 701/15 |
| 3,865,071 | A | * | 2/1975 | Manor | 116/282 |
| 4,110,605 | A | * | 8/1978 | Miller | 701/124 |
| 4,454,582 | A | * | 6/1984 | Cleary et al. | 701/15 |
| 4,638,437 | A | * | 1/1987 | Cleary et al. | 701/15 |
| 4,837,695 | A |   | 6/1989 | Baldwin |  |
| 4,843,554 | A | * | 6/1989 | Middleton et al. | 701/15 |
| 4,967,363 | A | * | 10/1990 | Bonafe | 701/15 |
| 5,047,942 | A | * | 9/1991 | Middleton et al. | 701/15 |
| 5,103,224 | A | * | 4/1992 | Arad | 340/959 |
| 5,124,700 | A | * | 6/1992 | Bonafe | 340/959 |
| 5,136,512 | A |   | 8/1992 | Le Borne |  |
| 5,353,022 | A | * | 10/1994 | Middleton et al. | 340/959 |
| 5,499,025 | A | * | 3/1996 | Middleton et al. | 340/959 |
| 6,133,857 | A | * | 10/2000 | Millard et al. | 340/959 |
| 6,188,937 | B1 | * | 2/2001 | Sherry et al. | 701/14 |
| 6,308,131 | B1 | * | 10/2001 | Fox | 701/124 |

(Continued)

OTHER PUBLICATIONS

U.S. Appl. No. 11/563,743, filed Nov. 28, 2006, Pitard et al.

*Primary Examiner*—Mark Hellner
*Assistant Examiner*—Ari M Diacou
(74) *Attorney, Agent, or Firm*—Oblon, Spivak, McClelland, Maier & Neustadt, L.L.P.

(57) ABSTRACT

A method for detecting an error in input of one of the takeoff parameters into a flight management system includes a step of calculating a limit value based on one or more takeoff parameters input into the flight management system. The method further includes a step of comparing the calculated limit value with characteristic takeoff values.

13 Claims, 5 Drawing Sheets

U.S. PATENT DOCUMENTS

| | | | |
|---|---|---|---|
| 6,411,869 B2 * | 6/2002 | Permanne | 701/3 |
| 6,533,219 B2 * | 3/2003 | Boe | 244/100 R |
| 6,983,206 B2 * | 1/2006 | Conner et al. | 701/301 |
| 7,079,951 B2 * | 7/2006 | Conner et al. | 701/301 |
| 7,129,857 B1 * | 10/2006 | Spirkovska | 340/971 |
| 7,158,052 B2 * | 1/2007 | Zammit-Mangion et al. | 340/959 |
| 7,363,145 B2 * | 4/2008 | Conner et al. | 701/120 |
| 7,587,278 B2 * | 9/2009 | Poe et al. | 701/301 |
| 7,702,461 B2 * | 4/2010 | Conner et al. | 701/301 |
| 2002/0079403 A1 * | 6/2002 | Boe | 244/1 R |
| 2005/0242235 A1 * | 11/2005 | Delaplace et al. | 244/75.1 |
| 2007/0124034 A1 * | 5/2007 | Pitard et al. | 701/15 |

* cited by examiner

METHOD FOR DETECTING AN ERROR IN INPUT OF ONE OF THE TAKEOFF PARAMETERS INTO A FLIGHT MANAGEMENT SYSTEM

CROSS-REFERENCE TO RELATED APPLICATION

This document claims priority to French Application Number 05 12019, filed Nov. 28, 2005, the entire contents of which are hereby incorporated by reference.

BACKGROUND OF THE INVENTION

Field of the Invention

The present invention relates to a method for detecting an error in input of one of the takeoff parameters into a flight management system.

SUMMARY OF THE INVENTION

In general, the present invention is aimed at improving the takeoff safety of an aircraft by verifying the agreement between takeoff parameters (weight, thrust, configuration, etc.) and characteristic takeoff speeds, or in other words the maximum speed V1 for the decision to abort takeoff, the speed VR of initiation of rotation of the airplane and the minimum speed V2 of climb to an altitude of 35 feet.

These characteristic takeoff speeds as well as the engine thrust to be applied on takeoff are calculated and optimized during flight preparation, prior to takeoff of an aircraft.

A calculation making it possible to optimize the performances of the aircraft at takeoff is performed. This calculation depends in particular on the state of the aircraft (weight, configuration, etc.), on external conditions (temperature, wind, etc.) and on the runway (length, condition, slope, etc.)

This calculation of characteristic takeoff speeds and of thrust on the basis of these input data can be performed manually using charts or by computer. It is performed by ground staff or directly by the pilots in the aircraft.

Nevertheless, if an error creeps into one of the input data used to determine the characteristic takeoff speeds and the thrust, it may cause a large error in the result of the calculations, especially in the values of characteristic takeoff speeds.

Moreover, these characteristic takeoff speeds, the engine thrust and certain parameters with which they can be calculated (weight, configuration, runway, etc.) are input with their values into the flight management system (FMS) prior to takeoff. This introduction of takeoff parameters can be performed manually via an interface or by downloading values calculated by the ground staff.

This input of values into the flight management system is also a source of potential errors, which if not detected may jeopardize takeoff safety of the aircraft.

In particular, the risks associated with errors in characteristic takeoff speeds may be tail touchdown at takeoff, stalling if airspeed is insufficient, runway overrun if takeoff speed is too high, etc.

The objective of the present invention is to improve the takeoff safety of an airplane by verifying the agreement among several takeoff parameters.

To this end, the present invention relates to a method for detecting an error in input of one of the takeoff parameters into a flight management system, comprising the following steps:

calculation of a limit value on the basis of one or more takeoff parameters input into the flight management system; and comparison of the calculated limit value with characteristic takeoff values.

Thus, by calculating limit values on the basis of parameters input and used initially for manual or computerized calculation of the characteristic takeoff speeds, and by comparing these limit values with the characteristic values used for takeoff, it is possible to detect an anomaly and then to alert the pilot of the risk of errors in the input values introduced into the flight management system.

According to one practical characteristic of the invention, the detection method additionally includes a step of alerting the pilot via an interface of the flight management system if the result in the comparison step is erroneous.

According to one characteristic of the invention, the takeoff parameters used in the calculation step are chosen from among at least the weight, the thrust and the configuration of the aircraft.

In particular, the weight is a necessary item of information for calculating the characteristic takeoff speeds, whose values are then entered into the flight management system. This weight as well as the other takeoff parameters is introduced directly into the flight management system in order to initialize the system correctly.

By calculating limit values on the basis of critical takeoff parameters, it is possible to detect an error in input of these parameters, which error was made either initially during calculation of characteristic takeoff speeds and engine thrust or in the flight management system during initialization of the flight management system by the pilot.

According to one embodiment of the invention, there are calculated, in the calculation step, regulatory limit values, and there are compared, in the comparison step, the input values of characteristic takeoff speeds with the calculated regulatory limit values.

In practice, these regulatory limit values are a function of the minimum ground control speed and of the minimum aerodynamic control speed.

This verification makes it possible to cover part of the risks associated with a value of one or more characteristic takeoff speeds input into the flight management system that is too low for a light aircraft weight.

In practice, the regulatory limit values are also a function of the stalling speed and of the minimum takeoff speed.

This verification makes it possible to cover the risks associated with an input value of characteristic takeoff speeds VR or V2 that is too low for a medium aircraft weight.

Furthermore, the regulatory limit values are also a function of the minimum slope at takeoff, making it possible to cover the risks associated with a value of characteristic takeoff speeds VR or V2 that is too low for a heavy aircraft weight.

According to one embodiment of the invention, there is calculated, in the calculation step, a takeoff distance on the basis of one or more takeoff parameters input into the flight management system, and there is compared, in the comparison step, the calculated takeoff distance with an available takeoff distance stored in the flight management system.

In practice, there is calculated, in the calculation step, the necessary ground-run distance to takeoff on the basis of at least the value of the minimum climb speed input into the flight management system, and there is compared, in the comparison step, the necessary ground-run distance with the available ground-run distance stored in the flight management system.

This verification therefore makes it possible additionally to cover the risks of runway overrun associated with an erroneous value in the input values of characteristic takeoff speeds VR or V2, or conversely with a poor selection of takeoff runway.

According to another embodiment of the invention, there is calculated, in the calculation step, on the basis of the takeoff parameters input into the flight management system, an estimated value of fuel remaining at the destination, and there is compared, in the comparison step, the estimated value of the fuel remaining at the destination with a threshold value calculated by the flight management system.

In practice, the threshold value is calculated by the flight management system on the basis of flight parameters input into the flight management system and comprising the quantities of fuel projected for flying in holding patterns and for ensuring possible diversion to an alternative airport.

This verification therefore permits the pilot to be certain that the inputs of the values of the weight of the airplane without fuel and of the planned weight of fuel are compatible with the consumption estimates made by the flight management system.

According to a second aspect, the invention relates to an aircraft equipped with a detection device designed to employ the detection method according to the invention.

Other special features and advantages of the invention will also become apparent in the description hereinafter.

BRIEF DESCRIPTION OF THE DRAWINGS

In the attached drawings, provided by way of non-limitative examples.

DETAILED DESCRIPTION OF THE PREFERRED EMBODIMENTS

Figure 1:
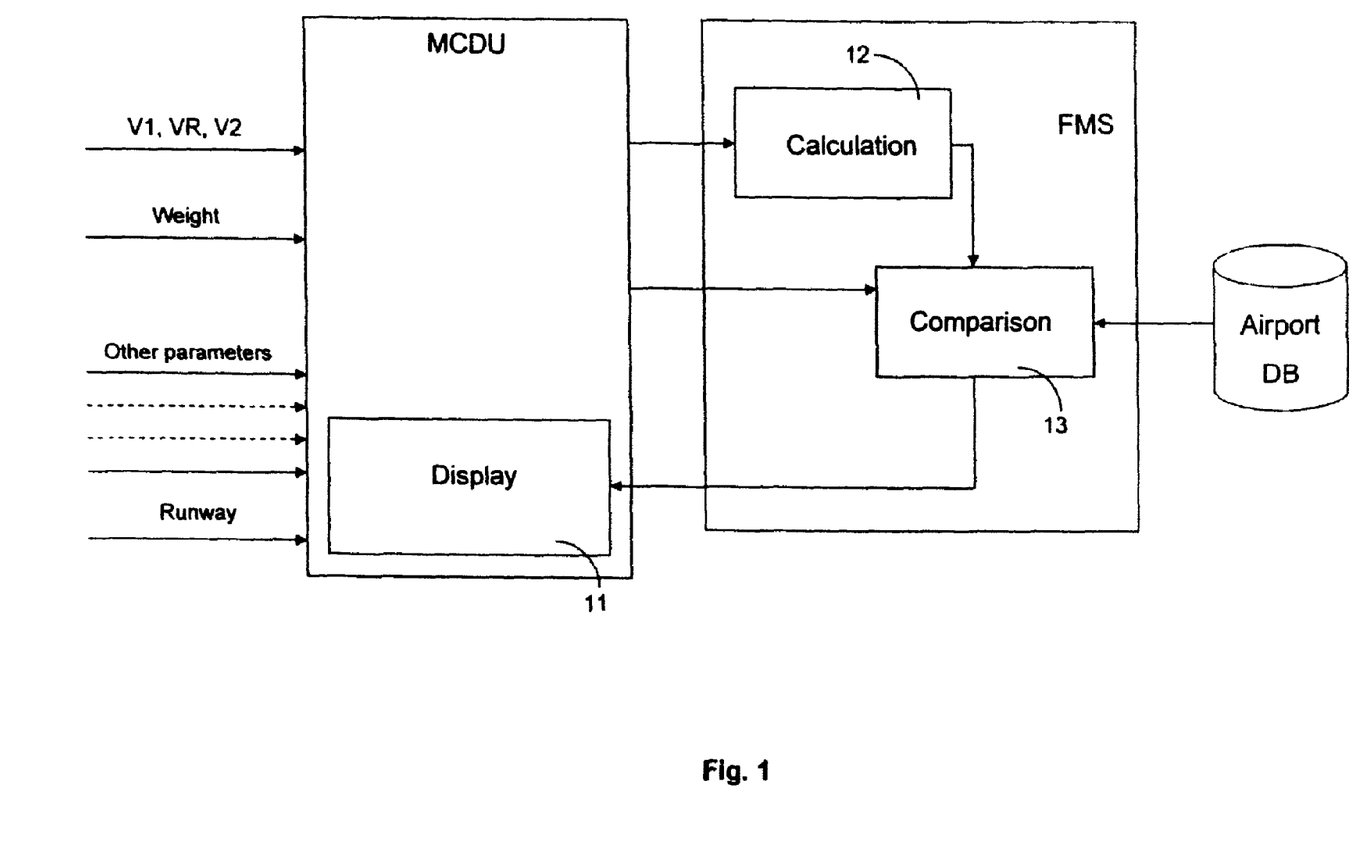
FIG. 1 is a block diagram illustrating a flight management system designed to employ the verification method according to the invention.

Referring now to FIG. 1, there will first be described a flight management system designed to employ the verification method according to the invention.

The flight management system (FMS) is known equipment of the aircraft and permits management of the information necessary for takeoff, flying and landing of the aircraft.

Hereinafter the invention is described with respect to an airplane, but it can be employed in any type of aircraft.

In particular, the flight management system stores the takeoff parameters in order to comply therewith and to provide information to the pilots in order that they can pilot the airplane during the ground run to takeoff and the initial climb of the airplane.

This flight management system (FMS) cooperates with an interface of the multipurpose control and display unit type (MCDU).

This interface MCDU makes it possible simultaneously to acquire data or parameters in the flight management system FMS, and it possesses display means 11 with which a certain number of messages intended for the pilots can be displayed.

A certain number of input data and input values are introduced via the interface MCDU into the flight management system FMS. The details of these inputs will become clearly apparent in the description hereinafter with reference to the verification method employed.

In particular, the values of the characteristic takeoff speeds are introduced at the input of the flight management system FMS.

In this embodiment, the input values of takeoff speeds V1, VR and V2 are introduced via the interface MCDU.

Of course, these values could be directly downloaded at the discretion of the pilots.

It will be recalled that these takeoff speeds, which are necessary to takeoff of the airplane, comprise in particular the maximum speed V1 for the decision to abort takeoff, the speed VR of initiation of rotation and the minimum speed V2 of climb to an altitude of 35 feet.

These takeoff speeds as well as the engine thrust at takeoff are defined by an optimization calculation based on current data concerning the airplane and its environment for takeoff.

This calculation and this optimization are performed outside the flight management system, the values then being introduced into this system to permit management of takeoff of the airplane.

In order to employ the verification method according to the invention, the flight management system is equipped in particular with calculating means 12 designed to calculate limit values of physical parameters on the basis of one or more input data introduced via the interface MCDU.

The flight management system also comprises comparing means 13 designed to compare these calculated limit values with characteristic takeoff values, which may also be introduced via the interface MCDU, or else may be stored in a database of the airport database type (Airport DB).

These calculating means 12 and comparing means 13 are employed by virtue of computer program routines stored in the flight management system and by means of a traditional microprocessor associated with storage means, comprising in particular a random access memory and a read only memory.

Figure 2:
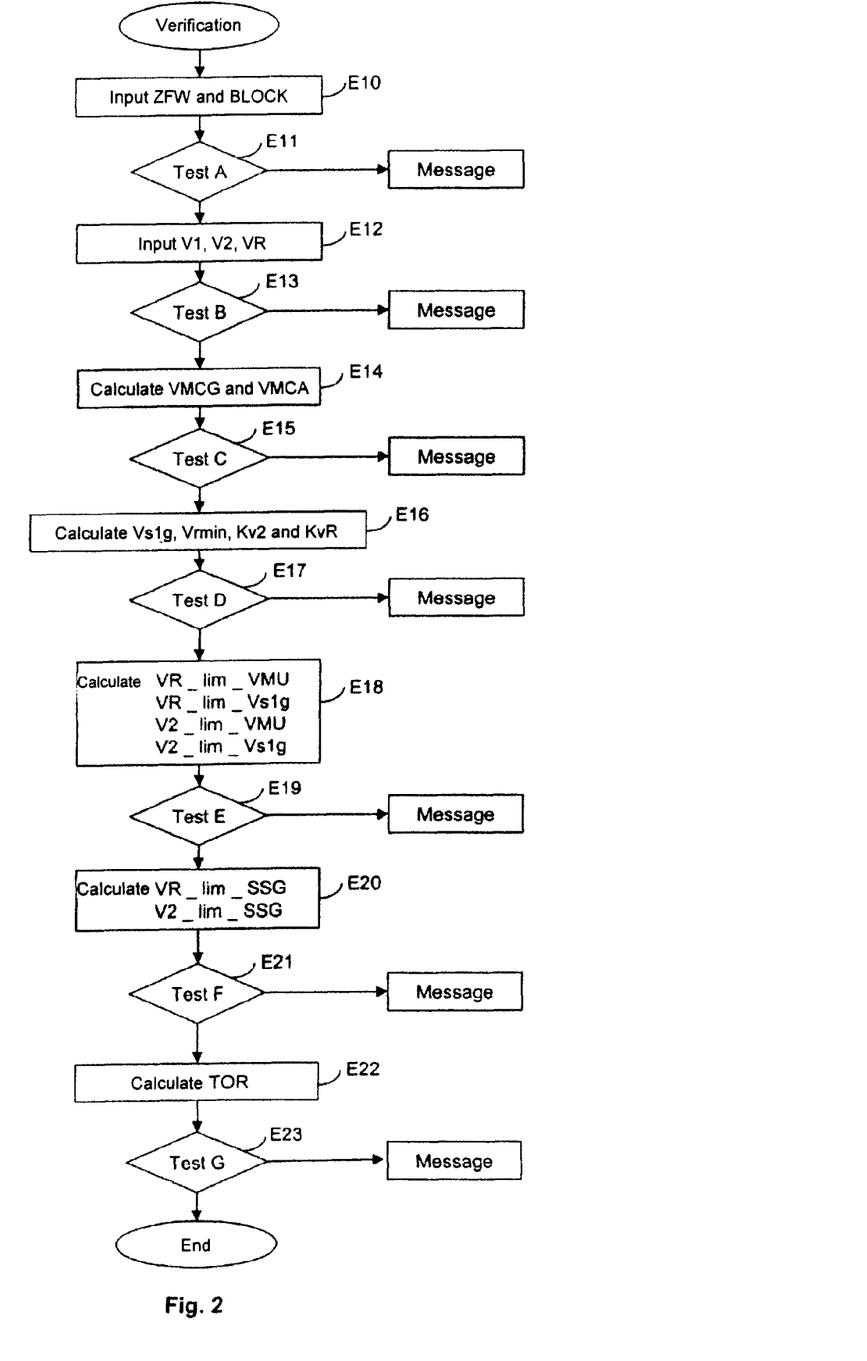
FIG. 2 is an algorithm of the verification method according to one embodiment of the invention.

Referring now to FIG. 2, there will be described a verification method employed in the flight management system.

This verification method consists in automatically initiating tests as soon as a certain number of data has been input into the flight management system via the interface MCDU and in displaying an explicit message on display means 11 of the interface MCDU in order to alert the pilot if certain constraints are not respected. The pilot will then be able to verify the parameters in question, and especially the values input into the flight management system.

In particular, one of the input data introduced is the weight ZFW of the airplane without fuel (Zero Fuel Weight), making it possible to initialize the airplane systems correctly. This weight is generally supplemented either by a prediction of the quantity of fuel (BLOCK) pumped into the airplane, a value that is also entered via the interface MCDU or downloaded, at the discretion of the pilots, or by measurement of the quantity of fuel present in the tanks when the error detection method according to the invention begins to run after the engines have been started (Fuel On Board or FOB). The addition of these two values minus the fuel consumed between startup of the engines and the beginning of takeoff (TAXI) yields the takeoff weight (TOW) of the aircraft.

In particular, when the zero fuel weight ZFW of the aircraft and the predicted weight (BLOCK) of fuel are input in an input step E10, a first test A makes it possible to verify whether these values comply with predetermined value ranges and whether the quantity of fuel input into the flight management system (BLOCK before engine startup) or measured after engine startup (FOB) is compatible with the consumption estimates made by the flight management system.

In comparison step E11, the ranges of acceptance of weights ZFW, BLOCK and TOW are defined in association with the airplane standard.

It is verified in comparison step E11 that the inputs of the values of aircraft weights ZFW and BLOCK and that the calculated value of weight TOW indeed comply with these ranges of values.

In particular, there are defined minimum operational values ZFW min and TOW min and maximum operational values ZFW max, BLOCK max and TOW max.

In practice, the following values are defined:
MEW of green airplane: manufacturer's empty weight, defined in such a way that all systems indispensable to use of the airplane are included in this value. Thus it does not depend on the furnishings and options specific to each operator.
MW: certified minimum weight, below which the use of the airplane is not authorized.
MZFW: maximum structural weight of the aircraft without fuel.
max BLOCK: maximum capacity of the fuel tanks associated with the maximum fuel density.
MTOW: certified maximum weight, above which the airplane is not authorized to take off.

The following limit values are then used:
ZFW min=MEW−margin
ZFW max=MZFW+margin
BLOCK max=maxBLOCK+margin
TOW min=MW−margin
TOW max=MTOW+margin In practice, the minimum and maximum operational values are stored in a table as a function of the airplane standard.

Since failure of test A means that it is impossible for the pilots to continue preparations for takeoff, false alarms are not acceptable. In order to guard against possible modifications of the values of MEW, MW, max BLOCK, MZFW and MTOW that might not be reflected immediately in the tables, the margins allow the acceptance interval for the parameters ZFW, BLOCK and TOW to be broadened. These margins are defined to cover all types of flights, by making an empirical allowance for modifications already observed in the course of time.

Test A consists in making the following comparisons:
ZFW≧ZFW min
ZFW≦ZFW max
BLOCK≦BLOCK max
TOW≧TOW min
TOW≦TOW max This part of test A is run automatically after step E10 of input of the value of ZFW, or else during modification of this value.

If the foregoing comparisons concerning the values ZFW and BLOCK are not satisfied, the incorrect value or values cannot be accepted, and a message is displayed via the interface MCDU in order to indicate the error to the pilot. The pilot must verify the value of the airplane weight input into the flight management system and input the corrected values.

Another part of this test A consists in comparing, in comparison step E11, the estimated remaining quantity of fuel at the destination (EFOB@DEST)—which value is estimated by the flight management system on the basis of inputs of weights (ZFW and BLOCK) and of flight parameters introduced into the flight management system (flight plan, winds, cruising altitude, fuel reserves, index cost, etc.)—with a threshold value corresponding to a minimum quantity of fuel necessary at the destination (MIN DEST FOB):
EFOB@DEST>MIN DEST FOB+margin.

This threshold value MIN DEST FOB is automatically calculated in calculation step E10 by the flight management system, as a function of the quantities of fuel provided for flying in holding patterns and to ensure possible diversion to an alternative airport defined in advance in the flight plan. This threshold value MIN DEST FOB may be modified by the pilot.

This part of test A is run automatically as soon as all of the data necessary for the predictions of consumption (especially ZFW and BLOCK) have been input into the flight management system and whenever a parameter influencing the estimates of consumption is changed (ZFW, BLOCK, cruising altitude, index cost, winds, etc.).

If the foregoing comparison is not satisfied, then the predictions of consumption at destination (displayed via the interface MCDU) are displayed in a different color, for the purpose of prompting the pilot to verify all of the input data and especially the weight data ZFW and BLOCK. A message is also sent to the pilot via the interface MCDU.

This test A therefore makes it possible to cover part of the risks associated with the input of erroneous values of airplane weight and fuel into the flight management system, as could result, for example, from a gross error of input of takeoff weight by a pilot, from a large error in fueling the aircraft or even from transposition of the airplane weight and the fuel weight. It also makes it possible to detect that the quantity remaining in the tanks is no longer sufficient to reach the alternative airport without breaking into the fuel reserve.

An input step E12 is then run to input the values of the characteristic takeoff speeds V1, V2 and VR into the flight management system.

In a comparison step E13, the agreement among the different characteristic takeoff speeds V1, V2, VR as entered into the flight management system can be verified.

In fact, a potential risk of erroneous acquisition of the input values exists during acquisition by the pilot of these values at the input via the interface MCDU.

In comparison step E13, test B consists in making the following comparisons:
V≧(0.84−margin)*VR
VR≧V1
V2≧VR In particular, the comparison between the decision speed V1 and the speed VR of initiation of rotation involves the value 0.84. This does not constitute a physical limitation or a regulatory constraint, but it is considered to be the smallest value taken into account in the calculation of takeoff speeds. A margin is applied to avoid possible false alarms.

Otherwise the comparison of the speed VR of rotation with the decision speed V1 relates directly to a regulatory constraint.

Similarly, the comparison of minimum climb speed V2 with the speed VR of initiation of rotation is a physical constraint for takeoff of the airplane.

At the end of this comparison step E13, if the comparisons of the speed VR of initiation of rotation with the maximum decision speed V1 and of the minimum climb speed V2 with the speed VR of initiation of rotation are not satisfied, a message is sent to the pilot.

Thus test B makes it possible to cover part of the risks associated with the input of an erroneous value of a characteristic speed into the interface MCDU.

The foregoing test makes it possible to verify the agreement between the input values of the characteristic takeoff speeds determined beforehand.

However, if one or more input data used to calculate the input values of the characteristic takeoff speeds are erroneous, these speeds can be wrong but nevertheless in agreement.

Consequently, it is important also to verify that the input value of the characteristic takeoff speeds into the flight management system is indeed in compliance with the regulatory limitations protecting the airplane.

In particular, a calculation step E14 is adapted for calculating the regulatory limit values VMCG and VMCA.

The value VMCG corresponds to the minimum ground control speed, and the value VMCA corresponds to the minimum aerodynamic control speed.

The values VMCG and VMCA are calculated in particular on the basis of the altitude of the runway, of the thrust level in the case of takeoff under reduced thrusts (Derated Take Off) and of the temperature at takeoff if available. If the temperature is not available in the flight management system, a default value of ground temperature is given for the purpose of being conservative and avoiding false alarms.

The values VMCA and VMCG are normalized in the airplane databases. Knowledge of the input parameters makes it possible to interpolate, in the tables of data existing and stored in the aircraft systems, the values of minimum ground control speed VMCG and minimum aerodynamic control speed VMCA specific to the takeoff conditions.

A comparison step E15 is then run in order to compare the input values of the characteristic takeoff speeds V1, VR, V2 with the previously calculated regulatory limit values VMCG and VMCA.

In practice, a test C consists in making the following comparisons:

V1≧(1−margin)*VMCG
VR≧(1.05−margin)*VCMA
V2≧(1.10−margin)*VCMA

The first comparison covers the input of an insufficient value of decision speed V1.

The second comparison covers the input of an insufficient value of speed VR of rotation The third comparison covers the input of an insufficient value of minimum climb speed V2.

Comparison step E15 is executed automatically following input of the characteristic takeoff speeds and of all of the parameters necessary for calculation of the minimum control values on the ground and in the air and also following modification of any of those.

The limitations of ground and air control speeds concern the airplane when it has light weight. Test C performed in this way in comparison step E15 is more effective for a light airplane weight.

If one of the tests performed in comparison step E15 is not satisfied, a message can be displayed on display means 11 of the interface MCDU in order to prompt the pilot to verify the value that he has input.

Thus test C makes it possible to cover part of the risks associated with a value of one or more characteristic speeds V1, V2, VR input into the flight management system that is too low for a light airplane weight.

A second calculation step E16 is also used to calculate other regulatory limit values including, for example, stalling speed Vs1g and the limitation VRmin.

The values Vs1g and VRmin are calculated on the basis of the altitude of the takeoff runway, of the weight of the airplane at takeoff and of the aircraft configuration at takeoff.

In addition, weighting coefficients Kv2 and KvR are calculated on the basis of the aircraft configuration at takeoff and of the thrust level in the case of takeoff with reduced thrust.

Other necessary values (ground temperature, anti-icing selection, conditioned air selection, slope of the takeoff runway) are provided as conservative default values. These values are stored in the flight management system so that they can be used in this calculation.

These values Vs1g, VRmin, Kv2 and KvR are normalized and can be determined on the basis of tables stored in the flight management system.

A comparison step E17 makes it possible to run a test D in which the following comparisons are performed:

V2≧Kv2*Vs1g
VR≧KvR*VRmin

The first comparison covers the input of an insufficient value of minimum climb speed V2, and the second comparison covers the input of an insufficient value of speed VR of rotation.

Test D is run automatically as soon as the characteristic takeoff speeds as well as all of the data necessary for calculation of the values Vs1g, VRmin, Kv2 and KvR have been input into the flight management system, and also whenever one of those is modified.

This test D makes it possible to verify that the minimum climb speed V2 and the speed VR of rotation are greater than the regulatory limits relating to takeoff. This test D is particularly well adapted for an airplane having a medium weight at takeoff.

If at least one of the comparison values is not satisfied, a message is sent to the pilot via the interface MCDU in order to prompt him to verify the input value of the speed.

In addition, as soon as the calculation of the value Vs1g takes into account the parameters of the airplane at takeoff, it is possible retrospectively to verify an erroneous input of these parameters, an error that occurred either at the moment of calculation of the characteristic takeoff speeds V1, V2, VR or when the values were input into the flight management system for the purpose of preparation for takeoff.

In view of making the foregoing test D more precise, a third calculation step E18 is run in order to calculate a certain number of regulatory values more precisely, corresponding to limitations protecting the aircraft from stalling or tail touchdown.

Inversely compared with calculation step E16, the values necessary for calculation of stalling speed Vs1g and minimum takeoff speed VMU are input as current values and no longer as fixed default values. These necessary values include in particular the ground temperature, anti-icing selection, conditioned air selection, and slope of the takeoff runway.

In general, the values V2_lim_Vs1g and V2_lim_VMU are calculated on the basis of the input data indicated in the foregoing, and the values VR_lim_Vs1g and VR_lim_VMU are deduced from the values V2_lim_Vs1g and V2_lim_VMU according to a V2–VR correspondence table that depends on the second-segment gradient, which itself depends on the thrust and airplane configuration.

Figure 3:
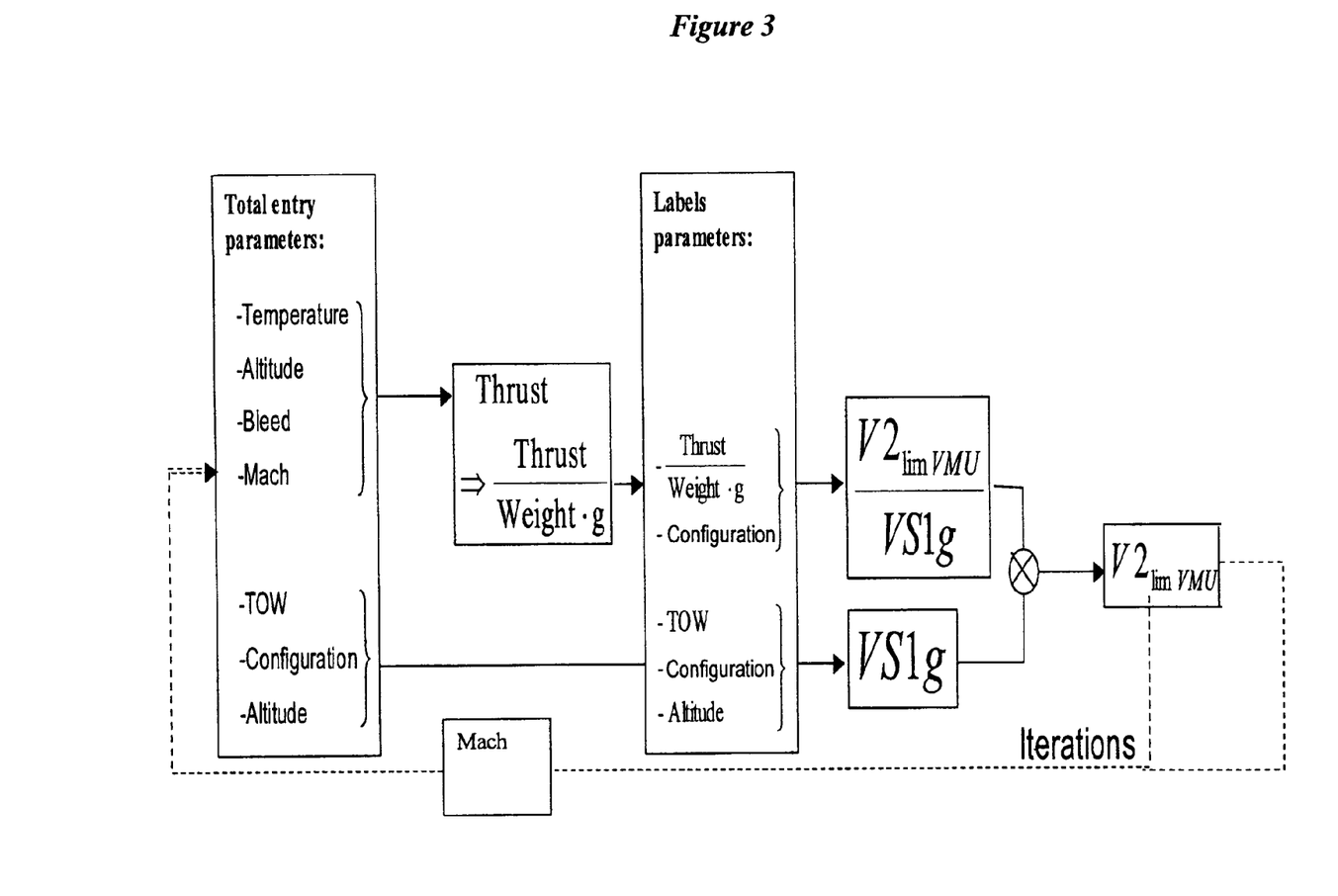
FIG. 3 shows a sample algorithm according to one embodiment of the present disclosure.

A sample algorithm for calculation of V2_lim_VMU is shown in FIG. 3.

V2_lim_VMU is calculated directly on the basis of tables normalized in the airplane databases and stored in the flight management system.

$$\frac{V2_{\lim\ VMU}}{VS1g}$$

depends directly on the thrust-to-weight ratio $$\frac{\text{Thrust}}{\text{Weight} \cdot g};$$

VS1g depends on the altitude, on the airplane configuration and on the weight of the aircraft at takeoff (TOW).

Knowledge of the input parameters makes it possible to interpolate within these tables. The engine thrust parameter, which is one of the input data of the $$\frac{V2_{\lim\ VMU}}{VS1g}$$

table, is normalized in the airplane databases and stored in the flight management system. The thrust table depends on the altitude, on the temperature, on the Mach number, on the anti-icing selection and on the conditioned air at takeoff (Bleeds). The Mach parameter is not known in advance. The calculation is therefore initialized with a reference Mach number given as 0.2. The Mach number corresponding to the speed V2_lim_VMU is then calculated and reinjected into the calculation of the thrust. The final V2_lim_VMU is obtained after several iterations over the Mach number and convergence.

The calculation of V2_lim_Vs1g is given directly by:

$$V2\_lim\_Vs1g = 1.13 \cdot VS1g$$

The value 1.13 is a regulatory value, and VS1g, a function of the weight at takeoff, of the configuration and of the altitude, is tabulated in the flight management system.

The values VR_lim_VMU and VR_lim_VS1g are deduced from V2_lim_VMU and V2_lim_VS1G according to a V2–VR correspondence table.

The V2-VR correspondence table, a function of the second-segment gradient and of the airplane configuration, will be stored in the form of a table in the flight management system. The second-segment gradient—represented by SSG—which constitutes the input of this table, is calculated according to the algorithm shown in FIG. 4.

Figure 4:
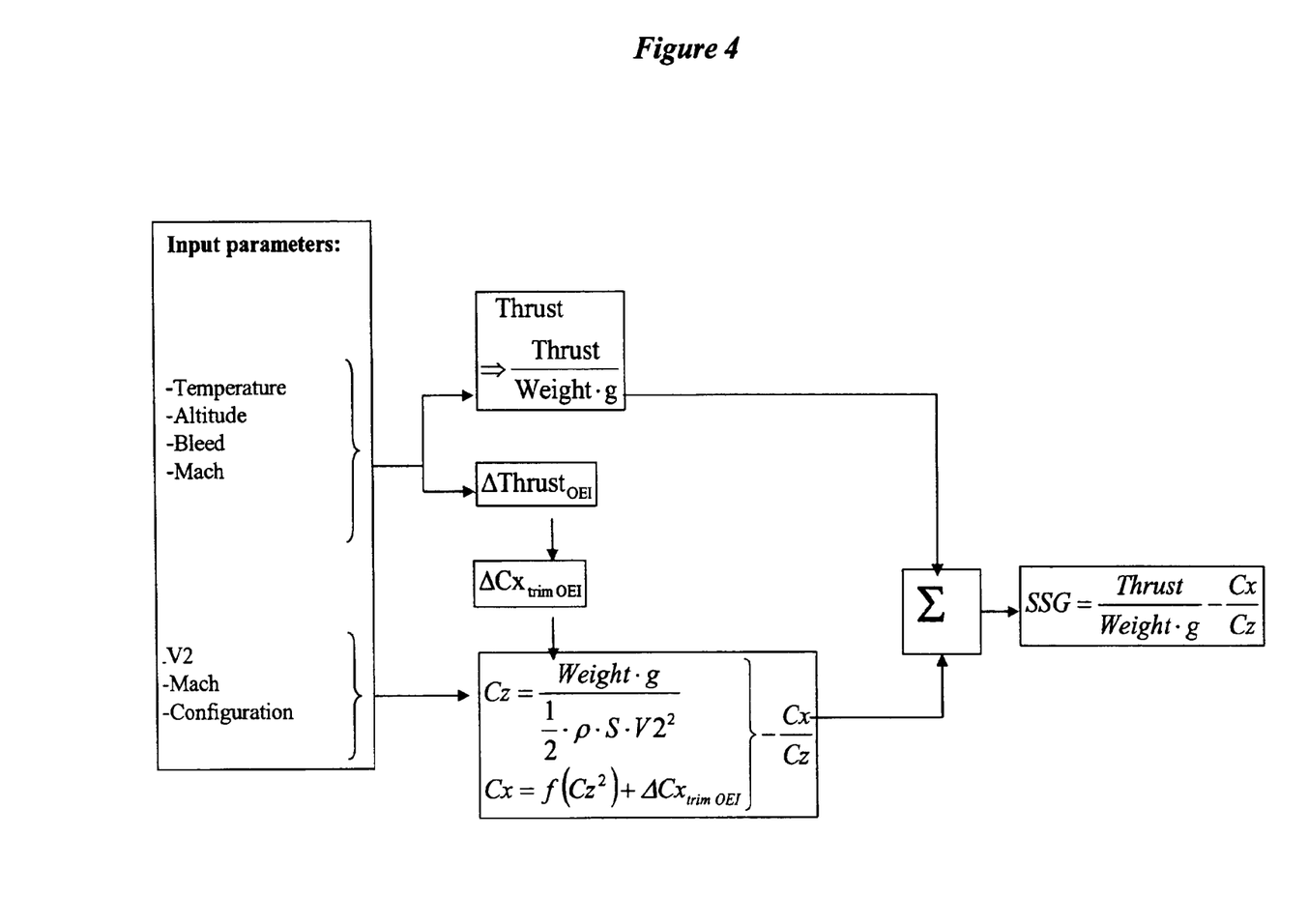
FIG. 4 shows a sample algorithm according to one embodiment of the present disclosure.

The second-segment gradient SSG depends on the thrust-to-weight ratio $$\frac{\text{Thrust}}{\text{Weight} \cdot g}$$

and on the ratio between the coefficients Cx and Cz of drag and lift respectively. The $$\frac{\text{Thrust}}{\text{Weight} \cdot g}$$

ratio is calculated in a manner identical to that used for the calculation of V2_lim_VMU, with the difference here that the Mach parameter is known from now on. The coefficients Cz and Cx of lift and drag are calculated as follows:

Cz is directly deduced from the lift equation using as input parameters the weight at takeoff and the known speed V2_lim_VMU or V2_lim_VS1g.

$$Cz = \frac{\text{Weight} \cdot g}{1/2 \cdot \rho \cdot S \cdot V2^2}$$

The parameters of air density ρ—which depends on the altitude and temperature—the reference surface S and the gravitational constant g are normalized and tabulated in the flight management system.

Cx is split into a base Cx and a trim Cx. The base Cx is deduced from the coefficient of lift Cz via a table normalized in the airplane databases and stored in the flight management system. The trim Cx, $\Delta Cx_{trim\ OEI}$, is calculated on the basis of the thrust dissymmetry due to an engine failure. This thrust dissymmetry $\Delta Thrust_{OEI}$ is deduced from tables of engine thrust stored in the flight management system. The trim Cx, a function of the dissymmetry, is also tabulated and normalized in the airplane databases.

The second-segment gradient SSG is deduced in this way from the foregoing parameters. The value of the second-segment gradient introduced as parameter into the (V2–VR) table is corrected by the value of the runway slope at takeoff.

As soon as these values are calculated, a comparison step E19 is run in order to perform a test E containing the following comparisons:

VR≧VR_lim_VMU
VR≧VR_lim_Vs1g
V2≧V2_lim_VMU
V2≧V2_lim_Vs1g

The comparisons at the limit value VR_lim_VMU or VR_lim_Vs1g make it possible to cover the input of an insufficient value of VR, and the comparisons with a limit value V2_lim_VMU or V2_lim_Vs1g make it possible to cover the input of an insufficient value of V2.

Test E is started automatically as soon as the characteristic takeoff speeds and all of the parameters necessary for calculation of the values Vs1g and VMU have been input, and also whenever one of those is modified.

If the result of one of these comparisons is not satisfied, a message is displayed to the pilot in order to prompt him to verify the input values of characteristic takeoff speeds.

Thus test E makes it possible to cover the risks associated with an input value of speed VR of rotation or of minimum climb speed V2 that is too low at the input of the flight management system for a medium airplane weight.

In addition, as soon as the weight of the airplane at takeoff is used for calculation of these regulatory limit values, this test E makes it possible to verify the agreement of the value of the airplane weight at takeoff, as input into the flight management system or used during calculation of the characteristic takeoff speeds.

In parallel with the different tests run in the foregoing, a fourth calculation step E20 is also run to calculate the value V2_lim_SSG and the value VR_lim_SSG.

This therefore involves verifying that the characteristic takeoff speeds VR and V2 input into the interface MCDU are indeed in compliance with the regulatory limitations protecting the aircraft from obstacles at the end of the runway.

This limitation corresponds to a minimum slope at takeoff of 3% for four-engine airplanes and of 2.4% for two-engine airplanes.

The value V2_lim_SSG is calculated on the basis of the altitude of the takeoff runway, of the weight at takeoff, of the airplane configuration at takeoff, of the thrust level, of the ground temperature, of the anti-icing selection and of the conditioned air selection.

The value VR_lim_SSG is deduced from the value V2_lim_SSG according to a VR/V2 correspondence table as a function of the second-segment gradient that depends on the thrust and on the airplane configuration.

Figure 5:
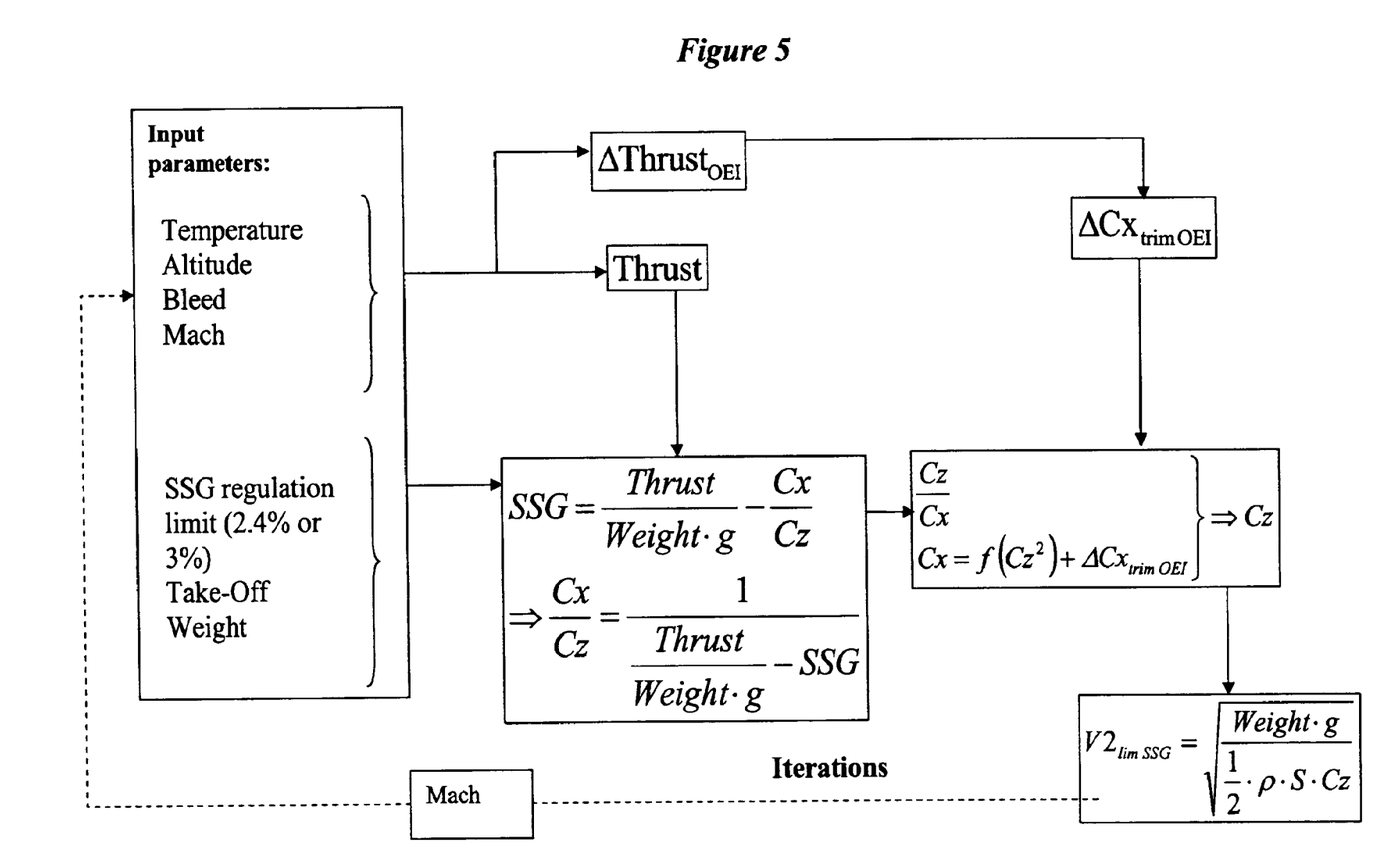
FIG. 5 shows a sample algorithm according to one embodiment of the present disclosure.

The calculation of V2_lim_SSG corresponds to the inverse of the calculation performed to determine the second-segment gradient. The limit of the second-segment gradient is known (3% for four-engine airplanes and 2.4% for two-engine airplanes), and it constitutes one of the input parameters of the calculation. The ratio Cx/Cz is deduced on the basis of the ratio $$\frac{\text{Thrust}}{\text{Weight} \cdot g},$$

calculated on the basis of the weight at takeoff and of the tables of engine thrust stored in the flight management system:

$$\frac{Cx}{Cz} = \frac{1}{\frac{\text{Thrust}}{\text{Weight} \cdot g} - SSG}$$

The value of the coefficient of lift Cz is deduced on the basis of normalized tables contained in the airplane databases for the parameters $Cx(Cz^2)$ and $\Delta Cx_{trim\ OEI}$. The speed V2_lim_SSG is deduced from the lift equation (the calculations of which are shown in the algorithm of FIG. 5):

$$V2 = \sqrt{\frac{\text{Weight} \cdot g}{1/2 \cdot \rho \cdot S \cdot Cz}}$$

Just as for the calculation that led to determination of V2_lim_VMU, the dependence of the thrust on Mach number requires that the calculation be initialized with a reference Mach value taken as 0.2. After iterations, V2_lim_SSG converges.

VR_lim_SSG is deduced from V2_lim_SSG and from the V2–VR correspondence table described hereinabove. Just as for the determination of VR_lim_VMU and VR_lim_VS1g, the value of the second-segment gradient introduced as parameter into the (V2–VR) table is corrected by the value of the slope of the runway at takeoff.

A comparison step E21 is then run on the basis of the regulatory limit values calculated in calculation step E20.

A test F makes it possible in particular to perform the following comparisons:

VR≧VR_lim_SSG
V2≧V2_lim_SSG

The first comparison covers the input of an insufficient value of speed VR of rotation and the second comparison covers the input of an insufficient value of minimum climb speed V2.

These comparisons are started automatically following input of the characteristic takeoff speeds and of all of the parameters necessary for calculation of the second-segment limitation values, and also following modifications of one of those.

Thus test F makes if possible to cover the risks associated with a value VR or V2 that is too low for a heavy airplane weight.

In addition, since this test F uses parameters of the airplane at takeoff as input data, it makes it possible retroactively to verify the input of these values into the flight management system by verifying the agreement of the calculated regulatory limits with the characteristic takeoff speeds input into the flight management system.

In parallel with the different tests described in the foregoing, there is provided a supplementary test making it possible to verify compliance with the runway length available during takeoff.

A calculation step E22 is adapted for calculating the necessary ground-run distance (Take Off Run) with all engines operative, on the basis of at least the value of the minimum climb speed V2 input into the flight management system.

The estimated necessary ground-run distance is therefore calculated on the basis of the altitude, of the slope of the takeoff runway, of the minimum climb speed V2, of the weight at takeoff, of the airplane configuration at takeoff, of the thrust, of the anti-icing selection, of the conditioned air selection, of the ground temperature and of the wind.

In practice, the necessary ground-run distance TOR (Take Off Run) is deduced from a simplified calculation of the estimated takeoff distance TOD0 with all engines operative.

As an example of simplified calculating means, and without being limitative, the estimated takeoff distance TOD0 is itself deduced from an approximation of a real takeoff (corresponding to a ground-run phase and a phase of flying up to 35 feet), by considering a single ground-run phase whose length is equal to the real takeoff length.

Considering this example of a simplified method of calculating the estimated takeoff distance TOD0, the ground run takes place starting from zero speed and reaching a final speed VF whose value can be deduced on the one hand from speed VR of rotation and minimum climb speed V2 as input via the interface MCDU by the pilot, and on the other hand from a predetermined speed increment ΔV2 or ΔVR that depends on several input parameters (weight, thrust, altitude, aerodynamics).

The final speed VF is therefore equal to VF=V2+ΔV2=VR+ΔVR.

The ground-run distance can then be calculated by integration of the final speed VF according to the equation for the mechanics of the ground run:

$$m \frac{dV}{dt} = Fn - R_D - \beta \cdot mg - \mu(mg - R_L)$$

in which:
Fn=thrust
$R_D$=drag
$R_L$=lift
m=weight at takeoff ("takeoff weight")
β=slope of the runway ("runway slope")
μ=coefficient of friction ("friction coefficient")

The necessary ground-run distance TOR is deduced from the necessary takeoff distance TOD0 by virtue of a precalculated coefficient.

A comparison step E23 then makes it possible to run a test G making it possible to verify that the necessary ground-run distance TOR calculated in calculation step E22 is shorter than the distance available for the ground run on the runway.

Test G comprises making the following comparison:
TOR_estimated<TOR_available

It will be noted that the available distance is a datum of the navigation base contained in the airplane systems, and in particular stored in the database Airport DB in the flight management system.

This comparison makes it possible to cover part of the risks of leaving the runway associated with an erroneous value of the speed VR of rotation or of the minimum climb speed V2, or else an erroneous value of thrust or of temperature input into the flight management system.

Conversely, it also makes it possible to detect the selection of a poor takeoff runway.

If the result of the comparison is not satisfactory, a message is sent to the pilot via the interface MCDU.

Thus the verification method described in the foregoing makes it possible to verify that all of the takeoff parameters input into the flight management system via the interface MCDU comply with a certain number of rules, and in particular to verify the agreement between the different parameters and the compliance with the limitations associated with the regulations.

Of course, the practical example described in the foregoing is in no way limitative.

In particular, it is possible to run only some of the tests A to G independently of one another.

Furthermore, the order in which the tests are run may be different from that described in the foregoing with reference to FIG. 2.

What is claimed as new and desired to be secured by Letters Patent of the United States is:

1. A method for detecting discrepancies in a flight management system of an aircraft, the method comprising:
    receiving values of takeoff speeds and takeoff parameters for said aircraft in the flight management system of said aircraft;
    calculating limit values based on the received takeoff parameters in the flight management system, and calculating regulatory limit values;
    first comparing the calculated limit values with takeoff values;
    second comparing the calculated regulatory limit values with the received values of takeoff speeds;
    detecting a discrepancy in the received values of takeoff speeds, the takeoff values, the limit values, and the regulatory limit values based on said first and second comparing; and
    displaying an alert corresponding to said discrepancy to a pilot of said aircraft.

2. The detection method according to claim 1, wherein the regulatory limit values are a function of a minimum ground control speed and of a minimum aerodynamic control speed.

3. The detection method according to claim 1, wherein the regulatory limit values are a function of a stalling speed and of a minimum takeoff speed.

4. The detection method according to claim 1, wherein the regulatory limit values are a function of a minimum slope at takeoff.

5. The detection method according to claim 1, further comprising:
    second calculating a takeoff distance based on one or more takeoff parameters in the flight management system; and
    third comparing the calculated takeoff distance with an available takeoff distance stored in the flight management system.

6. The detection method according to claim 5, further comprising:
    third calculating ground-run distance for takeoff based on at least a value of a minimum climb speed input into the flight management system; and
    fourth comparing the ground-run distance with an available ground-run distance stored in the flight management system.

7. The detection method according to claim 1, further comprising:
    second calculating, based on the takeoff parameters input into the flight management system, an estimated value of fuel remaining at destination; and
    third comparing the estimated value of the fuel remaining at the destination with a threshold value calculated by the flight management system.

8. The detection method according to claim 7, wherein said threshold value is calculated by the flight management system based on flight parameters input into the flight management system and comprising quantities of fuel projected for flying in holding patterns and for ensuring possible diversion to an alternative airport.

9. The detection method according to claim 1, wherein the takeoff parameters used in said calculating are chosen from among at least weight, thrust and configuration of an aircraft having said flight management.

10. An aircraft comprising:
    a detection device including,
        a receiving unit configured to receive values of takeoff speeds and takeoff parameters for said aircraft,
        a calculating unit configured to calculate limit values based on the received takeoff parameters, and configured to calculate regulatory limit values,
        a comparing unit configured to first compare the calculated limit values with takeoff values, and configured to second compare the calculated regulatory limit values with the received values of takeoff speeds,
        a detecting unit configured to detect a discrepancy in the received values of takeoff speeds, the takeoff values, the limit values, and the regulatory limit values based on said first and second comparing in the comparing unit, and
        a display configured to display an alert corresponding to said discrepancy to a pilot of said aircraft.

11. The aircraft according to claim 10, wherein the detection device is integrated into the flight management system of said aircraft.

12. The detection method according to claim 1, wherein the characteristic takeoff speeds are the maximum speed for the decision to abort takeoff, the speed of initiation of rotation of an aircraft and the minimum speed of climb to an altitude of 35 feet.

13. The detection method according to claim 1, further comprising:
    verifying an agreement among the received values of the characteristics takeoff speeds.

* * * * *